Patented May 11, 1954

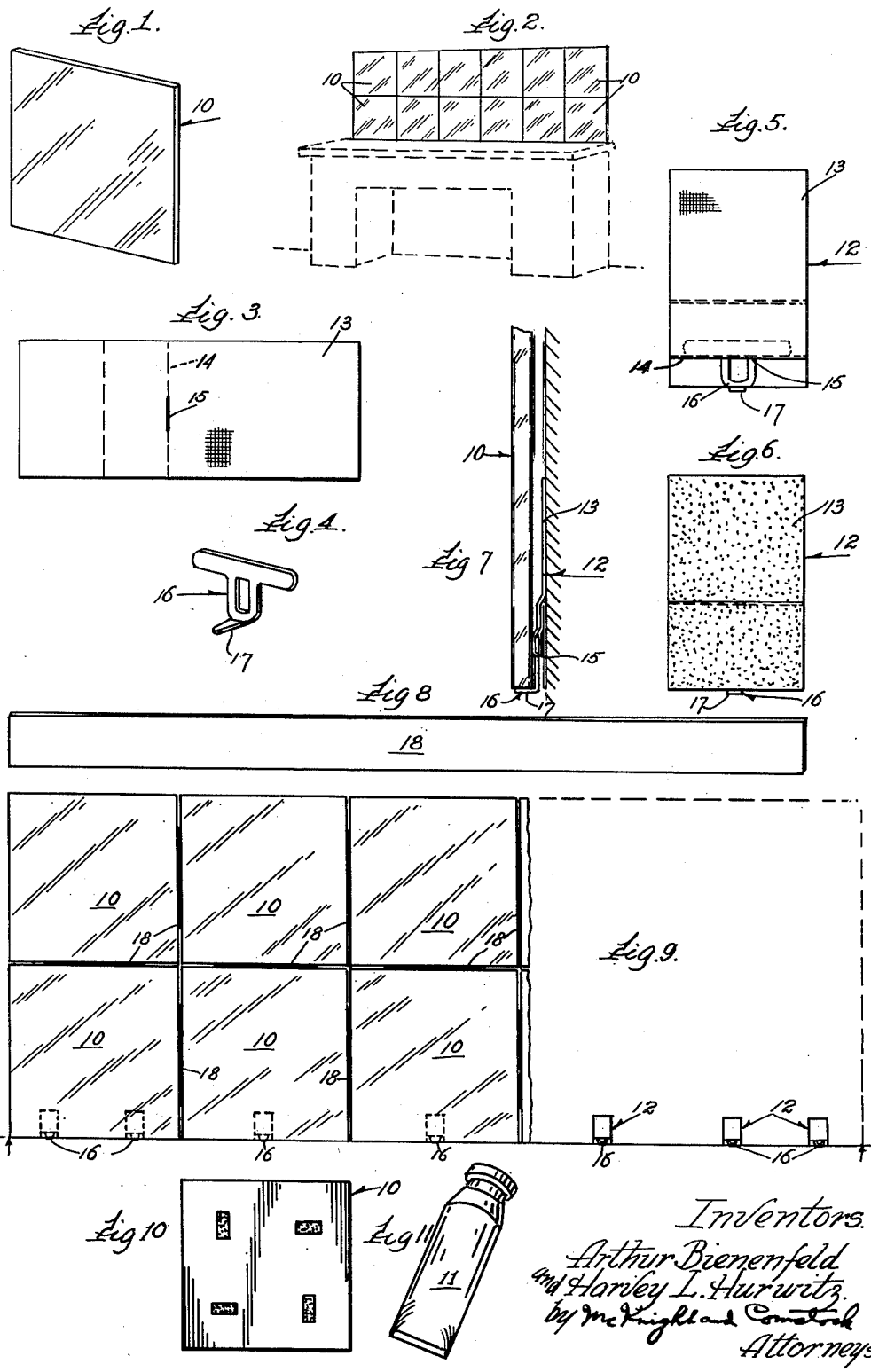

2,677,990

UNITED STATES PATENT OFFICE 2,677,990

MIRROR KIT FOR HOME DECORATION

Arthur Bienenfeld and Harvey L. Hurwitz, Chicago, Ill.

Application June 13, 1952, Serial No. 293,478

1 Claim. (Cl. 88—73)

This invention relates to a mirror kit which may be used by the home occupant himself for home decoration.

It is among the objects of our invention to provide such a kit which is complete in itself and is adapted to be used by a home occupant without special tools or equipment or without any outside instruction or assistance of any kind.

It is a further object of our invention to provide such a kit which will permit the home occupant to install easily and permanently on any wall or other area adjacent a fireplace, dressing table, bed or any other place desired in any room of the house or apartment, a single mirror or a plurality of mirrors in any combination or arrangement which may be desired.

With our invention, a room can quickly and easily be redecorated through the addition of a desirable mirror arrangement.

It is another object of our invention to provide such a kit for home use which is so economical that the user can actually save up to half of the cost of such home decoration by doing it himself. Our invention also comprises such other objects, advantages and capabilities as will later more fully appear and which are inherently possessed by our invention.

While we have shown in the accompanying drawings a preferred embodiment of our invention, yet it is to be understood that the same is susceptible of modification and change without departing from the spirit of our invention.

Referring to the drawings, Fig. 1 is a perspective view of a single mirror body member; Fig. 2 is a reduced perspective view of a mirror arrangement; Fig. 3 is an enlarged front elevational view of the clip tab cloth; Fig. 4 is an enlarged perspective view of the clip; Fig. 5 an enlarged front elevational view of the clip tab; Fig. 6 is an enlarged back elevational view of the clip tab; Fig. 7 is an enlarged side elevational view of a mirror and clip tab in place on a wall; Fig. 8 is an enlarged perspective view of the spacer strip; Fig. 10 is a back view of a single mirror, showing application of the mastic; and Fig. 9 is a front elevational view of a mirror arrangement; and Fig. 11 is an enlarged perspective view of the mastic tube.

A preferred embodiment of our invention comprises a body member 10 which is preferably formed of mirror glass. It may be made of plate mirror, antique mirror, crackle, veined or any other type of mirror which is suitable for the particular use for which it is intended. Instead of glass, body member 10 may be formed of plastic, metal or any mirrored material.

Body member 10 may be constructed in any straight edged form, such as square, rectangle or triangle. For simplicity in illustration, only the square shape is shown in the drawings. Body member 10 may be 6, 9, 12, 24 or any desired number of inches in size.

Our home mirror kit comprises a plurality of body members 10, preferably twelve in number. A tube 11 of mastic is provided for use in mounting body members 10 on the wall or other surface to be decorated. The mastic which is supplied with our kit cannot be the type which is commercially used for similar adhesive purposes because such products contain sulphur. If used in connection with a mirror, the sulphur would attack and damage the mirror backing. We have therefore designed a special sulphur free mastic which acts as an adhesive but does not affect the mirror in any way.

Our kit also includes a plurality of clip tabs 12, preferably 8 or more in number. Clip tab 12 is formed from an elongated rectangular piece of cloth 13. Cloth 13 is gummed on one side and is plain on the other side. Cloth 13 is bent back upon itself along a transverse line 14. An opening 15 is provided in cloth 13 along line 14. A T-shaped metallic clip 16 is positioned so that its upper or bar portion is adjacent line 14 between the folds of cloth 13. Clip 16 has a downwardly extending portion which projects through opening 15 and is provided at its end with a hook 17, which extends outwardly at a right angle from cloth 13. Cloth 13 is sealed to itself above line 14, so that the upper portion of clip 16 is held in position. Cloth 13 is reverse folded above the sealed portion, to provide additional gummed area for attachment to the wall.

Our kit also includes a plurality of spacer strips 18, preferably twenty in number. Spacer strips 18 are preferably formed of cardboard or other suitable material having approximate dimensions of ½″ wide 8″ to 12″ long and 1/64″ or less in thickness. In use, the home occupant first determines where the bottom of the mirror arrangement is to be and draws a light pencil line along the wall. This is the base line. The user then determines the lower left hand corner of the mirror arrangement and marks this point on the base line. He then marks off consecutive 12″ spaces (assuming that the body members 10 are 12″ square) for the number of body members 10 to be used.

The user then places a clip tab 12 two inches in from the lower left and lower right hand corners of the arrangement. This is done by moistening the gummed side of cloth 13 and pressing it against the wall or other surface to which the body members 10 are to be attached.

The clip tabs 12 should be positioned so that the hook 17 is along the base line. The user then places two additional clip tabs 12 ten inches in from the lower left and lower right hand corners of the arrangement. Additional clip tabs 12 are then placed in the center of each of the remaining 12" spaces along the base line.

The purpose of clip tabs 12 is to hold the body members 10 from slipping downwardly while the mastic is drying. The arrangement of clip tabs 12 described above provides two supports for each of the end body members 10 and one support for the in-between body members 10.

It should be noted that since the only purpose of clip tabs 12 is to hold the body members 10 from slipping before they are firmly set, the clip tabs 12 need not be used whenever the arrangement rests on a mantle or molding strip.

The user then opens the mastic tube 11 and places four ribbons of adhesive approximately two inches in from each of the four corners of one of the body members 10. The ribbons of adhesive should preferably be about two inches long and should parallel each of the four sides of body member 10.

One of body members 10 is then placed with its adhesive side against the wall, slightly above and to the right of the lower left hand corner of the arrangement. Body member 10 is then pressed firmly against the wall and slid down to its desired position corresponding with the previously marked lower left hand corner of the arrangement.

The next body member 10 is then mounted in position in the same manner. A slight space is left between the body members 10, into which a spacer strip 18 is placed edgewise. The second body member 10 is then moved so that spacer strip 18 is firmly wedged between the two body members 10. Additional body members 10 are then mounted in the same manner with a spacer strip 18 being used wherever the edges of any two body members 10 are in contact. The spacer members 18 are left in the seams overnight and are then removed. The slight air space left by their removal provides room for expansion of the glass forming body members 10 due to heat from a fireplace or temperature changes, to avoid any danger of the glass cracking. The method described will hold on any clean bonding surface, such as painted walls, wood, plywood, etc. It will also hold on wall paper, when the paper is firmly bonded to the wall. The wall or surface to which the body members 10 are to be attached should be wiped with a clean, dry cloth to remove any dust and should be free from oil, grease or any substance which might deter from a good bonding surface.

The clip tabs 12 are concealed beneath body members 10 and are not noticeable after body members 10 are in place. Clip tabs 12 are capable of supporting up to ten pounds of downward pressure and are thus capable of holding body members 10 in place.

Having thus described our invention, we claim:

A mirror kit for home decoration comprising twelve square body members formed of mirror glass, a supply of mastic applied to the backs of said body members for bonding them to an appropriate vertical surface, said mastic being free from ingredients deleterious to mirrors, a plurality of clip tabs comprising a piece of cloth gummed on one side, said cloth bent back upon itself on the gummed side along a transverse line, said cloth having an opening positioned at the center of said line, a metallic T-shaped clip having its upper portion positioned along said line, said cloth bent back upon and sealed to itself above said clip to hold said clip in place, said clip having a downwardly extending portion extending through said opening, said downwardly extending portion having a hook at the bottom thereof, said hook extending outwardly from said cloth at a right angle, said clip tabs attached to the vertical surface by moistening said gummed cloth and pressing it against said surface, whereby said hooks support the bottom edges of said body members and prevent said body members from slipping while said mastic is drying, and a plurality of long, narrow, cardboard spacer strips, said spacer strips temporarily inserted edgewise between the adjacent edges of said body members at the time said body members are adapted to the vertical surface, said spacer strips upon their removal provided space between said body members for heat expansion of said body members without the glass cracking, said kit adapted to be used by the home occupant himself without additional tools or specialized skill of any kind.

References Cited in the file of this patent

UNITED STATES PATENTS

| Number | Name | Date |
|---|---|---|
| 2,289,634 | Dieter | July 14, 1942 |

FOREIGN PATENTS

| Number | Country | Date |
|---|---|---|
| 609,691 | Great Britain | Oct. 5, 1948 |